F. R. LUECK.
WRENCH.
APPLICATION FILED OCT. 24, 1921.
1,430,574.
Patented Oct. 3, 1922.
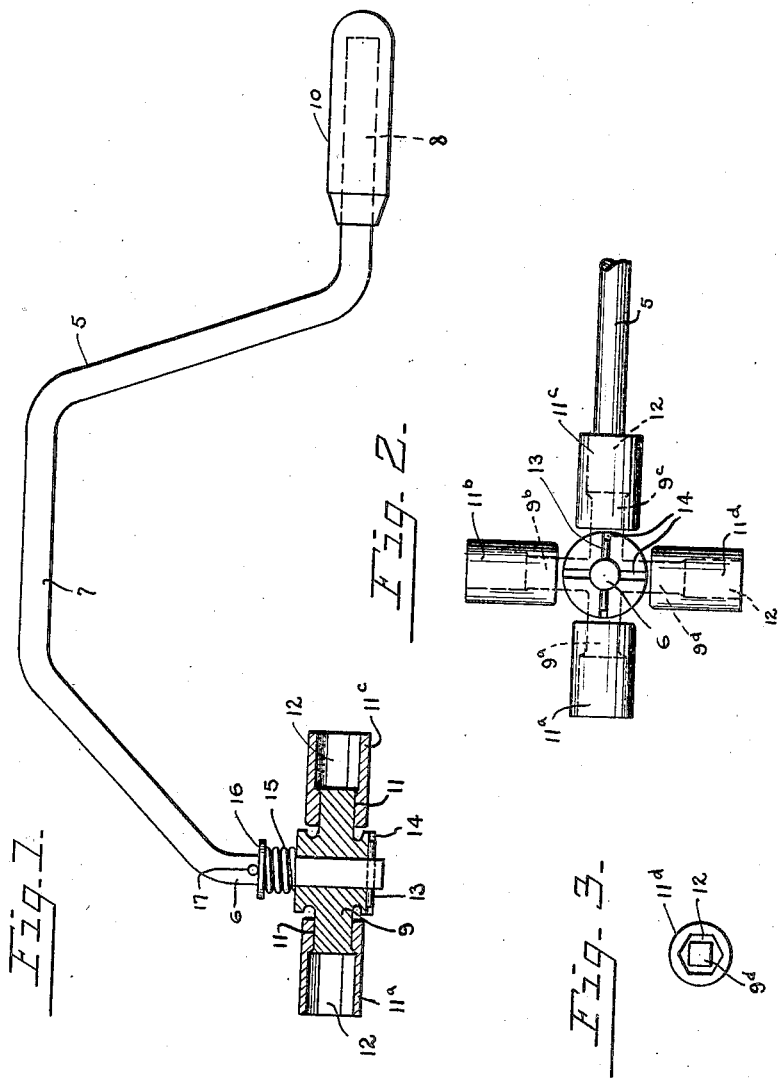
INVENTOR.
Frank R. Lueck
BY Morsell + Keeney
ATTORNEYS.

Patented Oct. 3, 1922.

1,430,574

UNITED STATES PATENT OFFICE.

FRANK R. LUECK, OF MILWAUKEE, WISCONSIN.

WRENCH.

Application filed October 24, 1921. Serial No. 509,957.

*To all whom it may concern:*

Be it known that I, FRANK R. LUECK, a citizen of the United States, and resident of Milwaukee, in the county of Milwaukee and State of Wisconsin, have invented new and useful Improvements in Wrenches, of which the following is a description, reference being had to the accompanying drawings, which are a part of this specification.

This invention relates to improvements in wrenches and particularly to that type of wrench employing a brace and which is adapted to manipulate the nuts of the bolts carried by a demountable rim for automobile tires.

One of the objects of the invention is to provide a member adjustably carried by the brace and which is provided with a plurality of sockets which vary in size so that the wrench may be readily adapted to manipulate nuts varying in size.

In its preferred form the invention contemplates a brace having a shank member, a crank portion and a handle portion in combination with a member rotatably mounted on said shank member and which is provided with a plurality of radially extending sockets varying in size; and a further object of the invention is to provide novel means for conveniently and effectively locking said rotatable member in the desired position and against movement relative to said shank member.

A further object of the invention is to provide a socket member of such construction and so mounted on the shank portion of the brace that when the socket member is in its normal position, it is in substantial alignment with the handle portion of the brace and the brace may be turned in the ordinary way to manipulate the nuts, but which is capable of being turned on said shank member substantially 90° from the position mentioned, whereby the brace as a whole may be swung around and used as a lever to turn the socket member, thereby greatly increasing the leverage applied to the nut.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a side elevational view of a wrench embodying the principles of the invention, certain portions being shown in section;

Fig. 2 is a front elevational view of the member rotatably mounted on the shank portion of the brace showing the several radially extending sockets; and Fig. 3 is a view looking into one of the sockets.

Like characters of reference designate like parts in the several views.

Referring now to the drawings, a brace, designated as a whole by the reference character 5, having a shank portion 6, a crank portion 7 and a handle portion 8 is provided, on said shank portion of which is mounted a member 9 capable of being moved relative thereto, preferably rotatably. The handle portion 8 is preferably provided with a hand-gripping member 10 rotatably mounted thereon.

The member 9 is formed with a plurality of radially extending arms, four being shown in the drawings, to wit, $9^a$, $9^b$, $9^c$ and $9^d$. The outer ends of these arms are substantially square in cross-section and adapted to fit into similarly shaped openings 11 provided in the inner ends of socket members $11^a$, $11^b$, $11^c$ and $11^d$, respectively. After the respective sockets have been inserted in place on the ends of the arms, the extremities of said arms are riveted or upset to provide a firm and rigid connection for the respective sockets. The outer end of each socket is formed with a suitable nut receiving opening 12, these openings preferably varying in size so that the wrench will accomodate nuts of various sizes.

The means provided for locking the rotatably mounted member 9 in the position desired and against movement relative to the shank portion 6 of the brace preferably includes a pin 13 which extends transversely through said shank portion and is adapted to enter either of the two recesses or grooves 14 formed in the front side of the member 9. The member 9 is urged against the pin 13 by a spring 15 coiled about the shank portion 6 and interposed between the rear side of the member 9 and the collar or washer 16, backward movement of the member 16 being prevented by a pin 17 extending transversely through said shank portion.

From the foregoing description it will be obvious that the member 9 may be readily turned on the shank portion 6 by pressing it toward the pin 17 to disengage the pin 13 from the groove it happens to occupy, thereby making it possible to bring any of the several sockets into substantial alignment with the handle portion 8 of the brace, and when the member 19 is brought into said position and the pressure is removed therefrom, the spring 15 will force it back toward the pin 13 and the pin will snap into the adjacent groove or recess 14, thus again effectively locking the member 9 against movement relative to said shank portion. The crank portion 7 of the brace member may then be swung around and the wrench used in the ordinary way for manipulating the nuts. The wrench, therefore, may be conveniently and quickly adjusted to manipulate nuts of different sizes.

It will also be apparent that the brace as a whole may be used as a lever to turn the sockets in case the nut is rusted on its bolt or for any other reason difficult to manipulate. For example, the member 9 may be turned through an angle of 90° relative to the shank portions 6 to bring the socket member 11ª from the position shown in Fig. 1 into the position occupied by the socket 11ᵈ shown in Fig. 2 and the brace as a whole may then be used as a lever to turned the socket 11ª in said latter position, thereby greatly increasing the leverage of the wrench, the length of the brace being considerably greater than the throw of the crank portion 7 thereof.

I claim:

1. A wrench comprising a brace member having a shank portion, a crank portion and a handle portion, a member rotably mounted on said shank portion and having a plurality of radially extending sockets, a pin carried by said shank portion transversely of its axis, said rotatable member being provided on its outer face with a plurality of radial grooves adapted to rigidly engage said pin, and a spring carried by said shank portion and adapted to maintain said rotable member in engagement with said pin.

2. A wrench comprising a brace member having a shank portion, a crank portion and a handle portion, a member rotably mounted on said shank portion and having a plurality of radially extending arms, sockets fixed to said respective arms, said sockets having nut receiving openings varying in size, a pin extending transversely through said shank portion, said rotatable member being formed with grooves adapted to receive said pin, and a spring carried by said shank portion and adapted to maintain said rotable member in engagement with said pin, said grooves being so arranged that said rotatable member may be locked on said shank portion with any of said sockets in substantial alignment with said handle portion.

3. A wrench comprising a brace member having a shank portion, a crank portion, and a handle portion; a socket member comprising a disc provided with radially extending socket carrying arms, rotatably and slidably mounted on said shank portion, the outer face of said disc being provided with a plurality of angularly spaced grooves; a pin rigid with the outer end of said shank portion, and extending transversely of its axis; a collar secured to said shank portion in spaced relation to said disc; and a spring interposed between said collar and the inner face of said disc, for yieldingly maintaining the grooves of said disc in engagement with said pin.

In testimony whereof, I affix my signature.

FRANK R. LUECK.